United States Patent
Blunt et al.

(10) Patent No.: US 7,602,331 B2
(45) Date of Patent: Oct. 13, 2009

(54) COMPUTATIONALLY EFFICIENT ADAPTIVE RADAR PULSE COMPRESSION SYSTEM

(75) Inventors: Shannon D. Blunt, Shawnee, KS (US); Thomas Higgins, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 0 days.

(21) Appl. No.: 11/837,243

(22) Filed: Aug. 10, 2007

(65) Prior Publication Data

US 2008/0074310 A1   Mar. 27, 2008

Related U.S. Application Data

(60) Provisional application No. 60/822,042, filed on Aug. 10, 2006.

(51) Int. Cl.
| | |
|---|---|
| G01S 13/28 | (2006.01) |
| G01S 13/526 | (2006.01) |
| G01S 7/292 | (2006.01) |
| G01S 13/00 | (2006.01) |
| G01S 7/00 | (2006.01) |

(52) U.S. Cl. .................... 342/159; 342/89; 342/118; 342/128; 342/130; 342/131; 342/132; 342/134; 342/135; 342/175; 342/195; 342/200; 342/201

(58) Field of Classification Search ........... 342/82–103, 342/118, 128–145, 159–164, 175, 189–197, 342/200–204
See application file for complete search history.

(56) References Cited

U.S. PATENT DOCUMENTS

| | | | | |
|---|---|---|---|---|
| 3,889,199 | A * | 6/1975 | Gutleber | 342/201 |
| 6,940,450 | B2 * | 9/2005 | Blunt et al. | 342/195 |
| 7,298,315 | B2 * | 11/2007 | Gerlach et al. | 342/159 |
| 2005/0046612 | A1 * | 3/2005 | Blunt et al. | 342/195 |
| 2006/0097908 | A1 * | 5/2006 | Gerlach et al. | 342/159 |
| 2006/0097909 | A1 * | 5/2006 | Blunt et al. | 342/159 |

OTHER PUBLICATIONS

S.D. Blunt et al., "A Novel Pulse Compression Scheme Based on Minimum Mean-Square Error Reiteration"; Proceedings of the International Radar Conference, 2003; Sep. 3-5, 2003; pp. 349-353; Digital Object Identifier 10.1109/RADAR.2003 1278765.*
S.D. Blunt et al., "Adaptive Pulse Compression"; Proceedings of the IEEE Radar Conference, 2004: Apr. 26-29, 2004; pp. 271-276.*
S.D. Blunt et al., "Multistatic Adaptive Pulse Compression"; IEEE Transactions on Aerospace and Electronic Systems; vol. 42, No. 3; Jul. 2006; pp. 891-903.*
S.D. Blunt et al., "Adaptive Radar Pulse Compression"; 2005 NRL Review; pp. 215-217.*
S.D. Blunt et al., "Adaptive Pulse Compression via MMSE Estimation"; IEEE Transactions on Aerospace and Electronic Systems; vol. 42, No. 2; Apr. 2006; pp. 572-584.*

* cited by examiner

*Primary Examiner*—Bernarr E Gregory
(74) *Attorney, Agent, or Firm*—Schwegman, Lundberg & Woessner, P.A.

(57) ABSTRACT

One aspect of this disclosure relates to a method for processing a received, modulated radar pulse to resolve a radar target from noise or other targets. According to an embodiment of the method, a radar return signal is received and samples of the radar return signal are obtained. A minimum mean-square error (MMSE) pulse compression filter is determined for each successive sample. The MMSE filter is separated into a number of components using contiguous blocking, where each component includes a piecewise MMSE pulse compression filter segment. An estimate of radar range profile is obtained from an initialization stage or a previous stage. The piecewise MMSE pulse compression filter segments are applied to improve accuracy of the estimate. The estimate is repeated for two or three stages to adaptively suppress range sidelobes to a level of a noise floor. Other aspects and embodiments are provided herein.

16 Claims, 6 Drawing Sheets

US 7,602,331 B2

COMPUTATIONALLY EFFICIENT ADAPTIVE RADAR PULSE COMPRESSION SYSTEM

RELATED APPLICATIONS

This application is based upon, and claims priority to, previously filed provisional application Ser. No. 60/822,042 filed on Aug. 10, 2006, hereby incorporated by reference. This application is also related to U.S. Pat. No. 6,940,450, incorporated by reference.

BACKGROUND

This disclosure relates generally to pulsed radar systems, and more particularly to computationally efficient adaptive radar pulse compression systems. In general, pulsed radar systems transmit a frequency or phase modulated long pulse (or waveform) which after being received is typically match filtered, thereby achieving a range resolution inversely proportional to the bandwidth of the transmitted waveform. The matched filter is the time-reversed complex-conjugate of the transmitted waveform. However, while matched filtering maximizes the target signal-to-noise ratio (SNR) for each range cell, application of the matched filter also results in range sidelobes that occur due to the correlation of the transmitted waveform with delayed versions of itself.

Minimization of range sidelobes has been a topic of intense scrutiny for several years. The prevalent approach to minimizing range sidelobes while maintaining close to the maximum SNR gain of the matched filter has been to employ some form of least squares (LS) estimation (U.S. Pat. No. 5,805,107). Least squares has been shown to provide the most efficient estimator when the additive noise is white. However, LS is not robust in that is does not account for scatterers outside the range cells of interest which can have a deleterious effect on estimation accuracy due to model mismatch.

Recently, an adaptive technique denoted as adaptive pulse compression (APC) was introduced (U.S. Pat. No. 6,940,450) that performs as well as LS yet does not suffer from the robustness problems of LS. However, APC incurs a high computation cost and thus is difficult to implement in a real-time system given current technology.

Thus, there is a need in the art for a computationally efficient adaptive radar pulse compression system.

SUMMARY

The above-mentioned problems and others not expressly discussed herein are addressed by the present subject matter and will be understood by reading and studying this specification.

Disclosed herein, among other things, is a system for processing a received, modulated radar pulse to resolve a radar target from noise or other targets. According to one embodiment of the present subject matter, a radar return signal is received and samples of the radar return signal are obtained. A minimum mean-square error (MMSE) pulse compression filter is determined for each successive sample. In one embodiment, the MMSE filter is separated into a number of components using contiguous blocking, where each component includes a piecewise MMSE pulse compression filter segment. An estimate of radar range profile is obtained from an initialization stage or a previous stage. The piecewise MMSE pulse compression filter segments are applied to improve accuracy of the estimate. The estimate may be repeated (e.g., for two or three stages) to adaptively suppress range sidelobes to a level of a noise floor. Other variations are provided in the detailed description.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
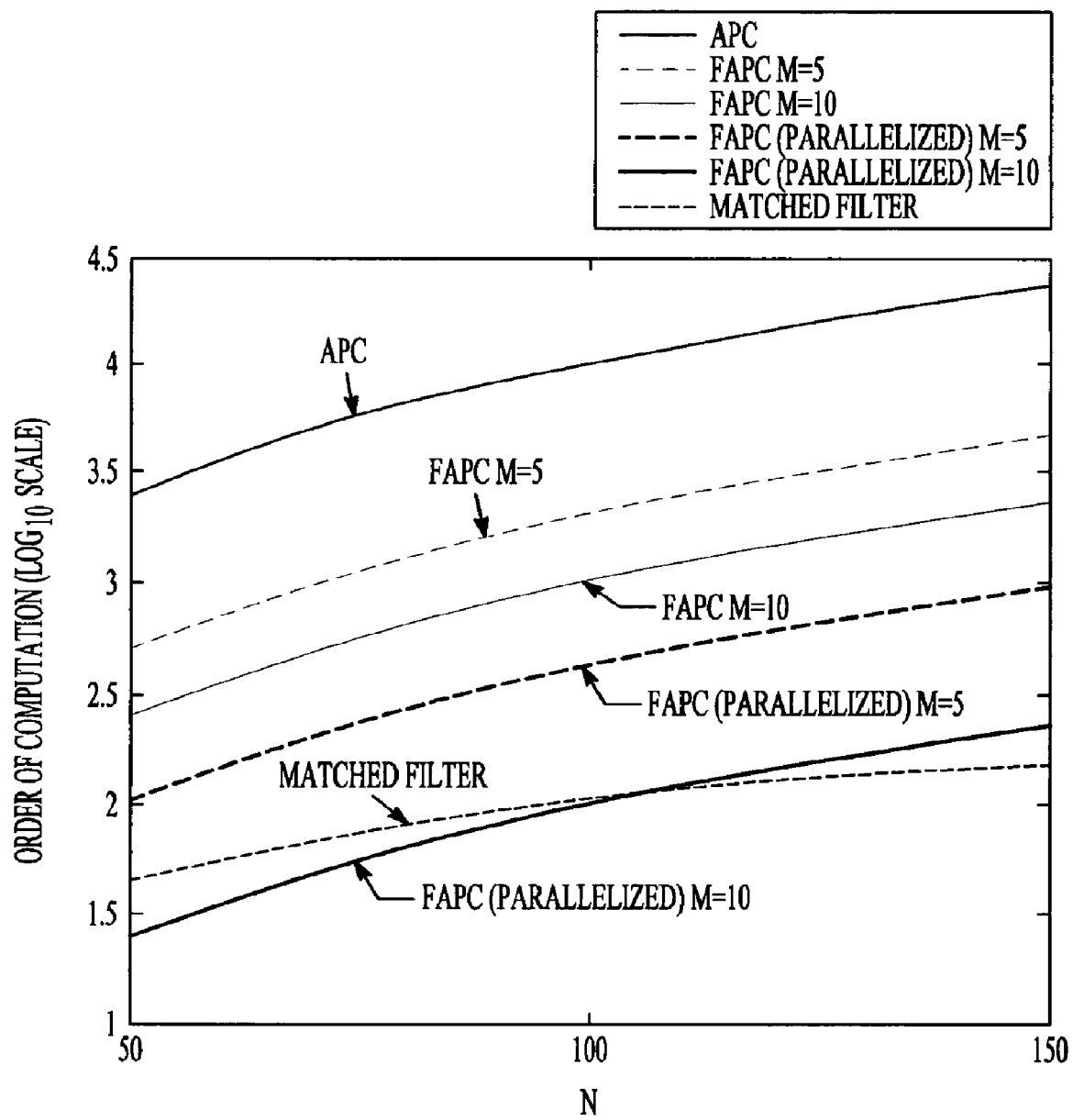
FIG. 1 illustrates a graphical diagram of computational complexity of a system for radar pulse compression, according to one embodiment of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Computationally efficient adaptive radar pulse compression, denoted as Fast APC (FAPC), has several embodiments. The two embodiments shown here include examples based on decimation and contiguous blocking. Other embodiments of FAPC will be discussed.

The discrete-time version of the transmitted waveform is denoted as the column vector $s=[s_0 \; s_1 \; \ldots \; s_N]^T$ having length N. In discrete notation, the received radar return at the $l^{th}$ range cell can be defined as $$y(l) = x^T(l)s + v(l) \quad (1)$$

for $l=0, \ldots, L+N-2$, where $x(l) = [x(l) x(l-1) \ldots x(l-N+1)]^T$ is the portion of the range profile that the transmitted waveform s convolves with at delay l, $v(l)$ is a sample of additive noise, $(\bullet)^T$ is the transpose operation, and L is the number of range cells of interest. Collecting N samples of the received radar return signal, the system response model can be expressed as $$y(l) = X^T(l)s + v(l) \quad (2)$$

where $y(l) = [y(l) \; y(l+1) \; \ldots \; y(l+N-1)]^T$, the noise vector $v(l) = [v(l) \; v(l+1) \; \ldots \; v(l+N-1)]^T$, and the matrix $$X(l) = [\,x(l) \;\; x(l+1) \;\; \ldots \;\; x(l+N-1)\,] \quad (3)$$

$$= \begin{bmatrix} x(l) & x(l+1) & \cdots & x(l+N-1) \\ x(l-1) & x(l) & \cdots & x(l+N-2) \\ \vdots & \vdots & \ddots & \vdots \\ x(l-N+1) & \cdots & x(l-1) & x(l) \end{bmatrix}.$$

The standard matched filter is applied as $$\hat{x}_{MF}(l) = s^H y(l) \quad (4)$$

for each range cell where $(\bullet)^H$ is the complex conjugate transpose, or Hermitian, operation. Adaptive pulse compression involves replacing the matched filter s in (4) with the range-dependent Minimum Mean-Square Error (MMSE) filter w(l), which is obtained by minimizing the MMSE cost function $$J(l) = E[|x(l) - w^H(l)y(l)|^2] \quad (5)$$

for each individual range cell l=0, 1, ..., L−1. For the two embodiments of the FAPC method, the original MMSE cost function of (5) is separated into M components where each component is the MMSE cost function for a length $$\tilde{J}(l) = \sum_{m=0}^{M-1} E\left[\left|\frac{1}{M}x(l) - \tilde{w}_m^H(l)\tilde{y}_m(l)\right|^2\right] \quad (6)$$

segment of the MMSE filter. The sum of cost function components is thus expressed as $$K = \frac{N}{M}$$

where $\tilde{w}_m(l)$ is the $m^{th}$ length-K segment of the length-N filter $\tilde{w}(l)$, which approximates the original APC filter w(l), and $\tilde{y}_m(l)$ is the $m^{th}$ length-K segment of the N contiguous samples of the received signal comprising y(l).

Minimization of the piecewise MMSE cost function in (6) yields the piecewise MMSE pulse compression filter $\tilde{w}(l)$, the $m^{th}$ length-K segment of which is denoted as $$\tilde{w}_m(l) = (E[\tilde{y}_m(l)\tilde{y}_m^H(l)])^{-1} E\left[\frac{1}{M}\tilde{y}_m(l)x^*(l)\right] \quad (7)$$

for m=0, 1, ..., M−1, where $(\bullet)^*$ is the complex conjugate operation. The following details the particular form realized by (7) when employing decimation and contiguous blocking, respectively.

Decimation FAPC

For the decimation approach, the $m^{th}$ decimated filter $\tilde{w}_m(l)$ from (7) is given by $$\tilde{w}_m(l) = [w_m w_{M+m} w_{2M+m} \cdots w_{N-3M+m} w_{N-2M+m} w_{N-M+m}]^T. \quad (8)$$

For example, for N=12 and M=3 so that $$K = \frac{12}{3} = 4,$$

the FAPC filter is $$\tilde{w}(l) = [\boxed{w_0}\ \boxed{w_1}\ \boxed{w_2}\ \boxed{w_3}\ \boxed{w_4}\ \boxed{w_5}\ \boxed{w_6}\ \boxed{w_7}\ \boxed{w_8}\ \boxed{w_9}\ \boxed{w_{10}}\ \boxed{w_{11}}]^T \quad (9)$$

$$\tilde{w}_0(l) = [\boxed{w_0}\ \boxed{w_3}\ \boxed{w_6}\ \boxed{w_9}]^T$$

$$\tilde{w}_1(l) = [\boxed{w_1}\ \boxed{w_4}\ \boxed{w_7}\ \boxed{w_{10}}]^T$$

$$\tilde{w}_2(l) = [\boxed{w_2}\ \boxed{w_5}\ \boxed{w_8}\ \boxed{w_{11}}]^T$$

where $\tilde{w}_m(l)$ is the $m^{th}$ decimated segment of the filter. The segmented return signal $\tilde{y}_m(l)$ from (6) and (7) is obtained by decimating the matrix X(l) of (3) and the vector v(l) as $$\tilde{X}_m(l) = [x(l+m)x(l+M+m)\ldots x(l+N-2M+m)x(l+N-M+m)] \quad (10)$$

$$\tilde{v}_m(l) = [v(l+m)v(l+M+m)\ldots v(l+N-2M+m)v(l+N-M+m)]^T \quad (11)$$

thus yielding the decimated received signal model $$\tilde{y}_m(l) = \tilde{X}_m^T(l)s + \tilde{v}_m(l) \quad (12)$$

where $\tilde{y}_m(l) = [y(l+m)\ y(l+M+m)\ \ldots\ y(l+N-2M+m)\ y(l+N-M+m)]^T$.

Substituting (12) for $\tilde{y}_m(l)$ in (7), and assuming that the range cells are, in general, uncorrelated with one another and also uncorrelated with the noise, the decimated filter segment is obtained as $$\tilde{w}_m(l) = \frac{1}{M}\rho(l)(\tilde{C}_m(l) + \tilde{R}_m)^{-1} s_m \quad (13)$$

where $\rho(l) = E[|x(l)|^2]$ is the expected power of x(l), $\tilde{R}_m = E[\tilde{v}_m(l)\tilde{v}_m^H(l)]$ is the decimated noise covariance matrix based on (11), and the decimated signal correlation matrix $\tilde{C}_m(l)$ is $$\tilde{C}_m(l) = \sum_{i=0}^{M-1} \sum_{k=-K+1}^{K-1} \rho(l+Mk-i+m) s_{i,k} s_{i,k}^H \quad (14)$$

where $s_{i,k}$ is the $i^{th}$ decimated segment of s delay shifted by k, e.g. for N=6 and M=2 so that $$K = \frac{6}{2} = 3.$$

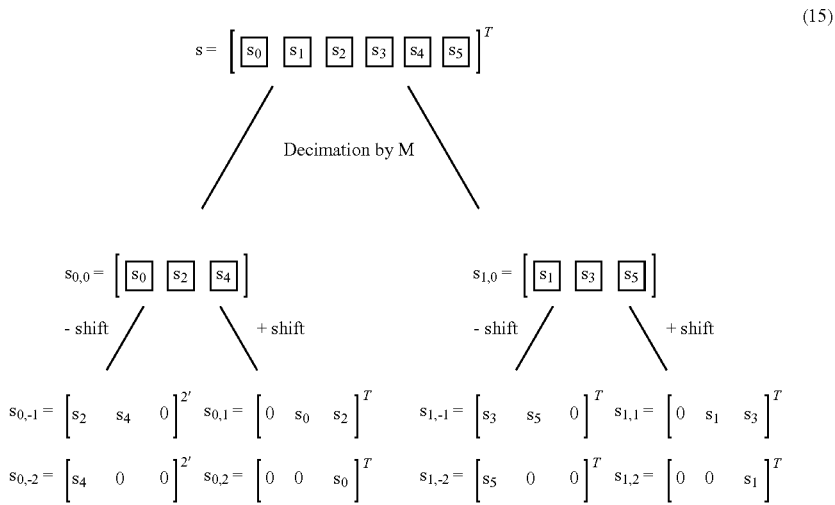

(15)

Contiguous Blocking FAPC

For the contiguous blocking approach, the blocked segments of the MMSE filter from (7) is given by $$\tilde{w}_m(l) = [w_{Km} \, w_{Km+1} \, w_{Km+2} \ldots w_{Km+K-3} \, w_{Km+K-2} \, w_{Km+K-1}]^T \quad (16)$$

for m=0, 1, ..., M−1. For example, given N=12, M=3 so that $$K = \frac{12}{3} = 4$$

yields $$\tilde{w}(l) = \begin{bmatrix} \boxed{w_0 \; w_1 \; w_2 \; w_3} \\ \boxed{w_4 \; w_5 \; w_6 \; w_7} \\ \boxed{w_8 \; w_9 \; w_{10} \; w_{11}} \end{bmatrix}^T \quad (17)$$

$$\tilde{w}_0(l) = [\,\boxed{w_0 \; w_1 \; w_2 \; w_3}\,]^T$$
$$\tilde{w}_1(l) = [\,\boxed{w_4 \; w_5 \; w_6 \; w_7}\,]^T$$
$$\tilde{w}_2(l) = [\,\boxed{w_8 \; w_9 \; w_{10} \; w_{11}}\,]^T$$

where $\tilde{w}_m(l)$ is the $m^{th}$ blocked segment of the filter $\tilde{w}(l)$. The segmented return signal $\tilde{y}_m(l)$ from (6) and (7) is obtained by blocking the matrix X(l) from (3) and the vector v(l) as $$\tilde{X}_m(l) = [x(l+Km) \, x(l+Km+1) \ldots x(l+Km+K-2) \, x(l+Km+K-1)] \quad (18)$$

$$\tilde{v}_m(l) = [v(l+Km) \, v(l+Km+1) \ldots v(l+Km+K-2) \, v(l+Km+K-1)]^T \quad (19)$$

yielding the contiguously blocked return signal model $$\tilde{y}_m(l) = \tilde{X}_m^T(l)s + \tilde{v}_m(l) \quad (20)$$

where $\tilde{y}_m(l) = [y(l+Km) \, y(l+Km+1) \ldots y(l+Km+K-2) \, y(l+Km+K-1)]^T$ for m=0, 1, ..., M−1.

Substituting for $\tilde{y}_m(l)$ in (7), and assuming that the range cells are, in general, uncorrelated with one another and also uncorrelated with the noise, we obtain the blocked filter segments are obtained as $$\tilde{w}_m(l) = \frac{1}{M}\rho(l)(\tilde{C}_m(l) + \tilde{R}_m)^{-1} s_m \quad (21)$$

for m=0, 1, ..., M−1, where $\rho(l)E[|x(l)|^2]$ is the expected power of x(l), $\tilde{R}_m = E[\tilde{v}_m(l)\tilde{v}_m^H(l)]$ is the blocked noise covariance matrix based on (19), and the matrix $\tilde{C}_m(l)$ is $$\tilde{C}_m(l) = \sum_{k=-N+1}^{K-1} \rho(l+k+Km) s_k s_k^H \quad (22)$$

where $s_k$ is the $k^{th}$ delay shift of the K-length blocked segment of the transmitted waveform s, e.g. for N=6 and K=3.

$$s = [\, s_0 \quad s_1 \quad s_2 \quad s_3 \quad s_4 \quad s_5 \,]^T \quad (23)$$

$$\ldots \; 0 \quad 0 \quad \boxed{s_0 \; s_1 \; s_2} \; s_3 \quad s_4 \quad s_5 \quad 0 \quad 0 \; \ldots$$

$$\ldots \; 0 \quad \boxed{0 \; s_0 \; s_1} \; s_2 \quad s_3 \quad s_4 \quad s_5 \quad 0 \quad 0 \; \ldots \xrightarrow{\text{Positive Shift}}$$

$$\xleftarrow{\text{Negative Shift}} \ldots \; 0 \quad 0 \quad s_0 \; \boxed{s_1 \; s_2 \; s_3} \; s_4 \quad s_5 \quad 0 \quad 0 \; \ldots$$

$$s_0 = [\,\boxed{s_0 \; s_1 \; s_2}\,]^T$$
$$s_0 = [\,\boxed{s_0 \; s_1 \; s_2}\,]^T$$
$$s_{-1} = [\,\boxed{s_1 \; s_2 \; s_3}\,]^T$$

Other Embodiments of FAPC

Other embodiments of the FAPC algorithm can be derived by selecting segments using a method other than blocking or decimation, e.g., for a length N=4 filter Full Length Filter $\tilde{w}(l)=[w_0\ w_1\ w_2\ w_3]^T$
Method 1 (Decimation) $\tilde{w}_0(l)=[w_0\ w_2]^T\ \tilde{w}_1(l)=[w_1\ w_3]^T$
Method 2 (Blocking) $\tilde{w}_0(l)=[w_0\ w_1]^T\ \tilde{w}_1(l)=[w_2\ w_3]^T$
Method 3 $\tilde{w}_0(l)=[w_0\ w_3]^T\ \tilde{w}_1(l)=[w_1\ w_2]^T$ When the segment length is constant the number of methods that can be used to segment the original APC cost function and derive FAPC is computed as $$\#\text{ of methods } = \prod_{i=0}^{M-2} \frac{\left(\frac{(N-Ki)!}{K!(N-K(i+1))!}\right)}{M-i}$$

where N is the length of the transmitted waveform, M is the number of segments, $$K = \frac{N}{M}$$

is the length of each segment, and (•)! denotes the factorial operation. There are also many embodiments of FAPC that can be derived using varying segment lengths, for example, one method when N=7, M=3, and $$K \neq \frac{N}{M}$$

is
Full Length Filter $\tilde{w}(l)=[w_0\ w_1\ \ldots\ w_6]^T\ \tilde{w}_0(l)=[w_0\ w_1]^T$
$\tilde{w}_1(l)=[w_2\ w_3\ w_4]^T\ \tilde{w}_2(l)=[w_5\ w_6]^T$ Implementation In its current state the FAPC filter for both realizations is a function of the powers of the radar range cells, which in practice are unavailable. We may take into consideration this lack of prior knowledge by initializing the algorithm using the result from applying the matched filter normalized by N.

Given an estimate of the radar range profile from the initialization stage or a previous stage, one can then apply (7) in order to further improve the accuracy of the estimate. It has been found that two or three stages are sufficient to adaptively suppress the range sidelobes to the level of the noise floor. Also, the robustness measures used in the original APC algorithm (U.S. Pat. No. 6,940,450) to limit the dynamic range and prevent ill conditioning can also be employed for FAPC.

4. Advantages and New Features

The FAPC method can significantly reduce computational complexity while maintaining acceptable SNR performance. Each of the M segmented matrices $(\tilde{C}_m(l)+\tilde{R}_m)$ have dimension K×K and are more computationally efficient to invert than the N×N dimensional matrix (C(l)+R) in the original APC algorithm. A fast matrix update can also be used to reduce the computation of the matrix inverse in the same manner as employed in U.S. Pat. No. 6,940,450. Furthermore, parallel processing may be utilized so that the M segments can be computed separately and then combined to obtain the full length-N filter. Additionally, the FAPC algorithm can be applied only as needed in the regions around range cells that contain large targets to further reduce the order of computation. FIG. 1 and Table 1 illustrate the computational efficiency that can be achieved using FAPC compared to the original APC and the standard matched filter. Note that when the fast update and parallelization are utilized and the number of segments is $M=\sqrt{N}$ and thus $K^2=(N/\sqrt{N})^2=N$, the order of computational complexity per stage for FAPC is the same as the matched filter, which is currently employed in real-time systems. However, as the number of segments M approaches the filter length N, the performance of FAPC degrades to that of the matched filter.

TABLE 1

| | Order of Computation per Iteration | | |
|---|---|---|---|
| | No Enhancement | Fast Update | Fast Update & Parallelization |
| FAPC | $O(MK^3)$ | $O(MK^2)$ | $O(K^2)$ |
| APC | $O(N^3)$ | $O(N^2)$ | Not Applicable |

Figure 2A:
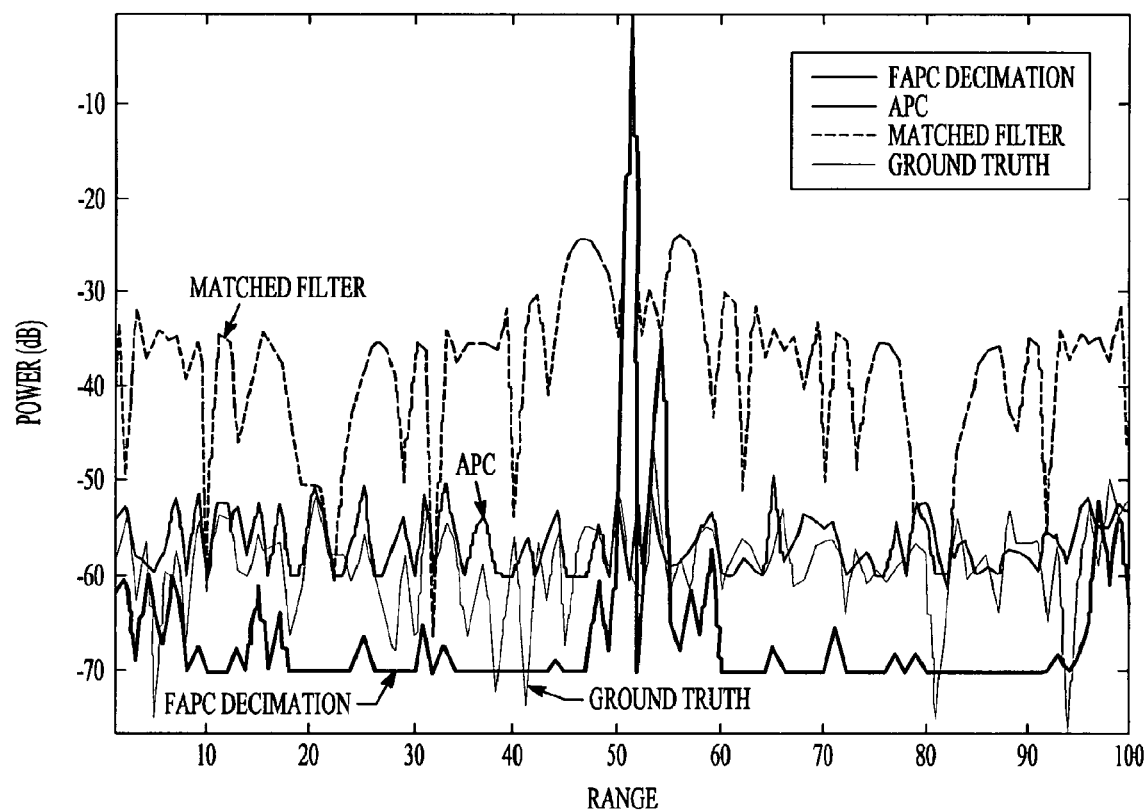
FIGS. 2A-2B illustrate graphical diagrams of performance of systems for radar pulse compression, according to one embodiment of the present subject matter.
Figure 2B:
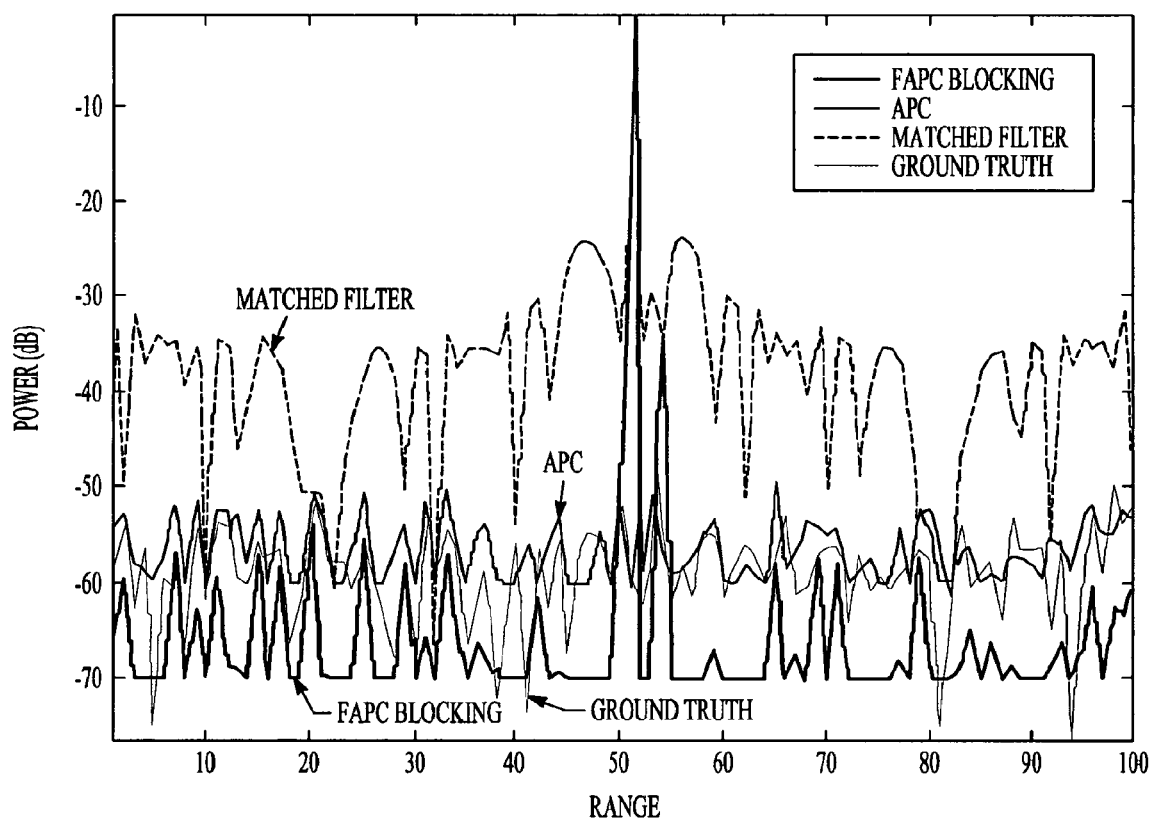
Figure 3A:
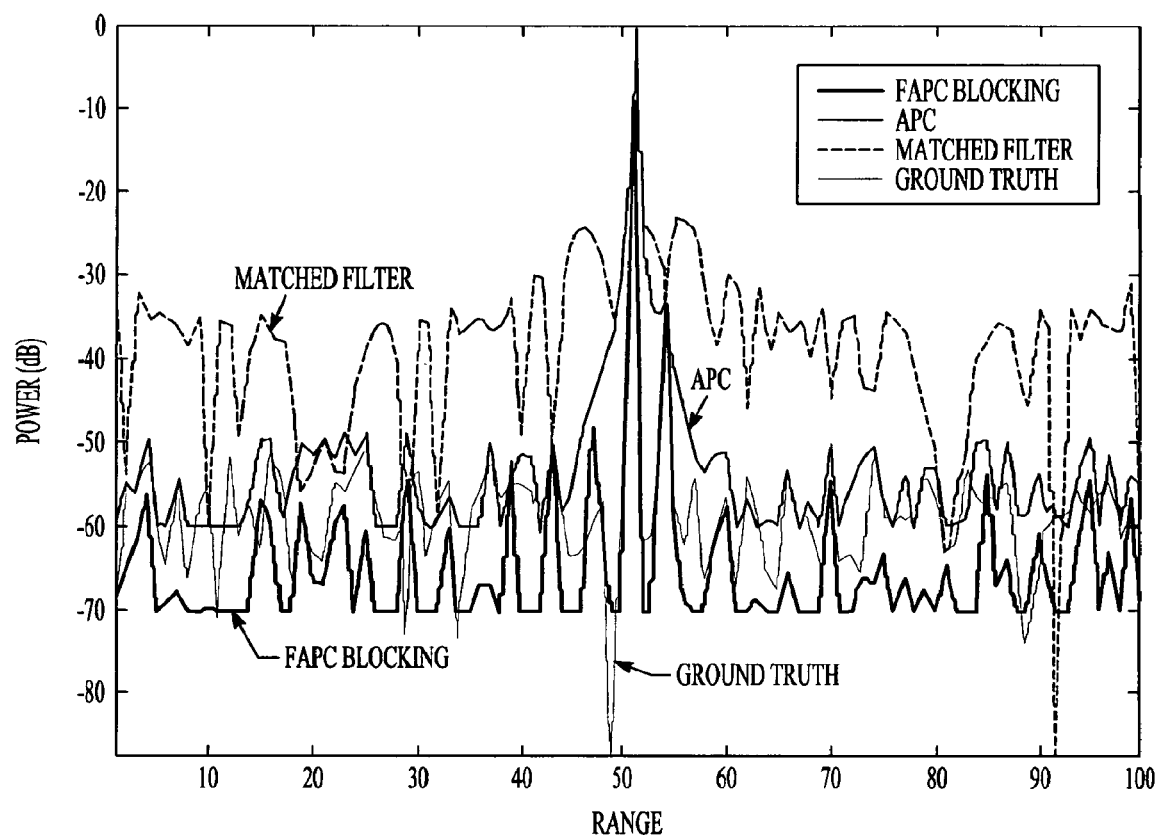
FIGS. 3A-3B illustrate graphical diagrams of performance of systems for radar pulse compression having a phase shift, according to one embodiment of the present subject matter.
Figure 3B:
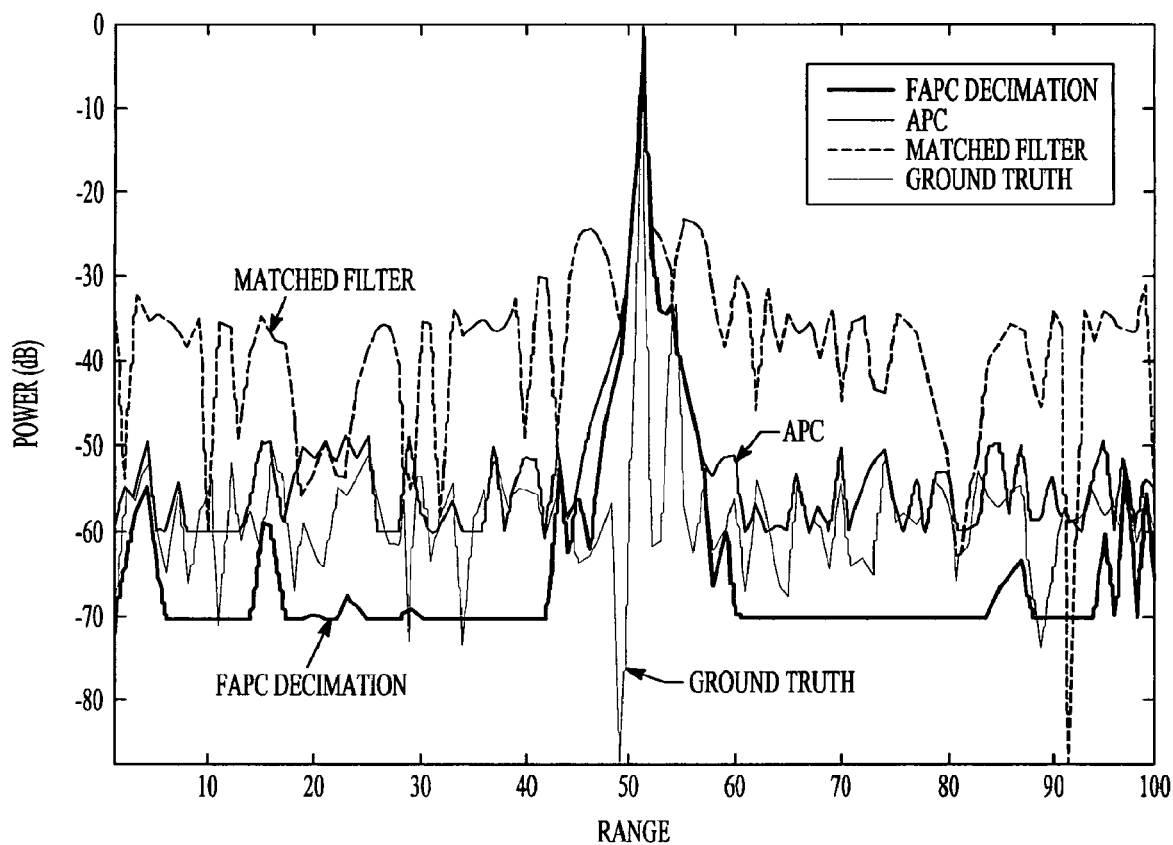

FIGS. 2A and 2B show the performance of the blocking and decimation FAPC algorithms compared to the original APC algorithm and the matched filter in which we use a length N=60 P3 code, set M=4, and perform three stages of both APC and FAPC after initial matched filtering. The radar range profile contains a large target masking a small target. FIGS. 3A and 3B depicts a similar case where the large target has a radial motion such that it induces a Doppler phase shift equivalent to a Mach 6 target illuminated by a 1 μs pulse at S-band. The decimation version of FAPC suffers some range sidelobe spreading due to Doppler mismatch as did the original APC method. The blocking version of FAPC is, however, much more robust to Doppler mismatch.

5. Exemplary Embodiment

Figure 4:
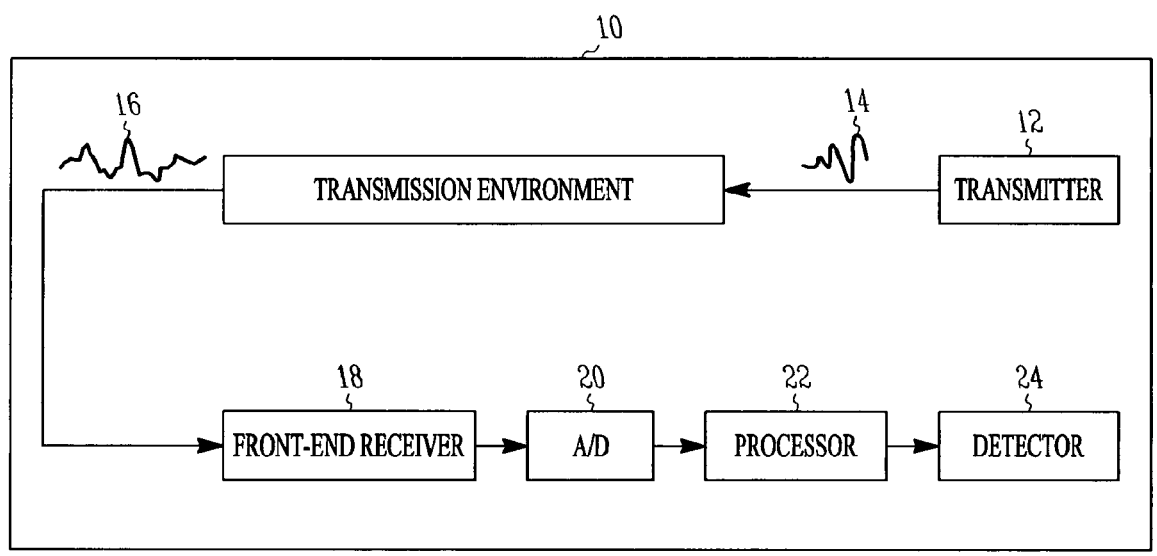
FIG. 4 is a schematic diagram of an exemplary predictive deconvolution system.

Referring to FIG. 4, an exemplary predictive deconvolution system 10 includes a transmitter 12 for transmitting a phase or frequency modulated pulse (or waveform) 14 that, upon interacting with a transmission environment's unknown impulse response 16 (to be estimated), forms a signal 18 that is a convolution of waveform 14 and the impulse response 16. Depending upon the type of transmitted waveform (e.g., radar, acoustic, or laser), the system may also include other transducing elements of various types. An analog front-end receiver 18 receives the signal 16, and an analog-to-digital (A/D) converter 20 samples and converts the received signal 16 into digital form. A processor 22 may be programmed to execute any of the estimation algorithms as described herein and in U.S. Pat. No. 6,940,450 in various embodiments. The processor may execute an FAPC and/or MMSE algorithm iteratively for a number of stages until range sidelobes are suppressed to a desired level. A detector 24 may then further process the impulse response estimate produced by the estimation algorithm.

An estimation algorithm as described herein may be characterized as a method for estimating the range profile of a physical system that characterizes the location of scatterers in the physical system as designated by a plurality of range cells. In one embodiment, the method includes the steps of: 1) transmitting an energy pulse waveform to the physical system, wherein a discrete-time version of the transmitted waveform is denoted as the column vector $s=[s_0\ s_1\ \ldots\ s_N]^T$ having length N, where N is an integer; 2) receiving a return signal produced by scattering of the transmitted waveform by the physical system as represented by the convolution of the transmitted waveform with the impulse response of the physical system, the received return signal being denoted in discrete notation at the $l^{th}$ range cell as:

$$y(l)=x^T(l)s+v(l)$$

for l=0, ..., L+N−2, where $x(l)=[x(l)\ x(l-1)\ ...\ x(l-N+1)]^T$ is the portion of the range profile that the transmitted waveform s convolves with at delay l, v(l) is a sample of an additive noise signal, and L is the number of range cells of interest; 3) computing an estimate $\hat{x}(l)$ of the impulse response of the physical system and thereby the range profile as:

$$\hat{x}(l)=\tilde{w}^H(l)y(l)$$

where $\tilde{w}(l)$ is a piecewise Minimum Mean-Square Error (MMSE) pulse compression filter; 4) computing $\tilde{w}(l)$ by combining M number of length-K filter segments corresponding to M number of length-K segments of the received signal y(l), and wherein the $m^{th}$ length-K filter segment $\tilde{w}_m(l)$ is computed as:

$$\tilde{w}_m(\ell) = (E[\tilde{y}_m(\ell)\tilde{y}_m^H(\ell)])^{-1} E\left[\frac{1}{M}\tilde{y}_m(\ell)x^*(\ell)\right]$$

for m=0, 1, ... M−1, where $\tilde{y}_m(l)$ is the $m^{th}$ length-K segment of the N contiguous samples of the received signal y(l); and, 5) combining the filter segments $\tilde{w}_m(l)$ in a manner corresponding to the segmentation of the received signal y(l) that approximates a range-dependent MMSE filter w(l) obtained by minimizing the MMSE cost function $$J(l)=E[|x(l)-w^H(l)y(l)|^2]$$

for each individual range cell l=0, 1, . . . , L−1. In one embodiment, $$K = \frac{N}{M}$$

such that the K-length segments are of the same length. In another embodiment, $$K \neq \frac{N}{M}$$

such that the K-length segments are of varying length.

In a further particularization of the method described above, the received signal y(l) is segmented in a decimated manner such that:

$$\tilde{y}_m(l)=[y(l+m)y(l+M+m)\ ...\ y(l+N-2M+m)y(l+N-M+m)]^T$$

for m=0, 1, . . . , M−1; and, the filter segments are computed as:

$$\tilde{w}_m(\ell) = \frac{1}{M}\hat{\rho}(\ell)(\tilde{C}_m(\ell) + \tilde{R}_m)^{-1} s_m$$

where $\hat{\rho}(l)=|\hat{x}(l)|^2$ the estimated power of x(l), $\tilde{R}_m=E[\tilde{v}_m(l)\tilde{v}_m^H(l)]$ is a decimated noise covariance matrix based on a decimated segmentation of the noise signal v(l) like that of the received signal y(l), and the decimated signal correlation matrix $\tilde{C}_m(l)$ is:

$$\tilde{C}_m(\ell) = \sum_{i=0}^{M-1} \sum_{k=-K+1}^{K-1} \hat{\rho}(\ell + Mk - i + m) s_{i,k} s_{i,k}^H$$

where $s_{i,k}$ is the $i^{th}$ decimated segment of s delay shifted by k based on a decimated segmentation of s like that of the received signal y(l).

In an alternative further particularization, the received signal y(l) is segmented into contiguous blocks such that:

$$\tilde{y}_m(l)=[y(l+Km)y(l+Km+1)\ ...\ y(l+Km+K-2)y(l+Km+K-1)]^T$$

for m=0, 1, . . . , M−1; and the filter segments are computed as:

$$\tilde{w}_m(\ell) = \frac{1}{M}\hat{\rho}(\ell)(\tilde{C}_m(\ell) + \tilde{R}_m)^{-1} s_m$$

where $\hat{\rho}(l)=|\hat{x}(l)|^2$ is the estimated power of x(l), $\tilde{R}_m=E[\tilde{v}_m(l)\tilde{v}_m^H(l)]$ is a blocked noise covariance matrix based on a blocked segmentation of the noise signal v(l) like that of the received signal y(l), and the blocked signal correlation matrix $\tilde{C}_m(l)$ is $$\tilde{C}_m(\ell) = \sum_{k=-N+1}^{K-1} \hat{\rho}(\ell + k + Km) s_k s_k^H$$

where $s_k$ is the $k^{th}$ delay shift of the K-length blocked segment of the transmitted waveform s based on a blocked segmentation of s like that of the received signal y(l).

The method may initialize the value of $\hat{x}(l)$ by a matched filter method as:

$$\hat{x}(l)=s^H y(l)$$

where the value of $\hat{x}(l)$ is then updated as:

$$\hat{x}(l)=\tilde{w}^H(l)y(l)$$

using the piecewise MMSE pulse compression filter $\tilde{w}(l)$ as described. The method may also initialize the value of $\hat{x}(l)$ by a matched filter or other method and then iteratively compute the value of $\hat{x}(l)$ as:

$$\hat{x}(l)=\tilde{w}^H(l)y(l)$$

using the piecewise MMSE pulse compression filter $\tilde{w}(l)$ for a plurality of stages in order to adaptively suppress range sidelobes to a desired level.

The processor 22 of a system such as illustrated in FIG. 4 may be programmed to execute the MMSE algorithm in any of the embodiments described above or in U.S. Pat. No. 6,940,450, which embodiments may be combined together in any desired manner. The same embodiments may also be implemented as programmed instructions stored in a processor-readable medium such as an electronic, optical, or magnetic storage medium.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

What is claimed is:

1. A method for estimating the range profile of a physical system that characterizes the location of scatterers in the physical system as designated by a plurality of range cells, comprising:

transmitting an energy pulse waveform to the physical system, wherein a discrete-time version of the transmitted waveform is denoted as the column vector $s=[s_0 \; s_1 \; \ldots \; s_N]^T$ having length N, where N is an integer;

receiving a return signal produced by scattering of the transmitted waveform by the physical system as represented by the convolution of the transmitted waveform with the impulse response of the physical system, the received return signal being denoted in discrete notation at the $l^{th}$ range cell as:

$$y(l)=x^T(l)s+v(l)$$

for $l=0, \ldots, L+N-2$, where $x(l)=[x(l) \; x(l-1) \ldots x(l-N+4)]^T$ is the portion of the range profile that the transmitted waveform s convolves with at delay l, v(l) is a sample of an additive noise signal, and L is the number of range cells of interest;

computing an estimate $\hat{x}(l)$ of the impulse response of the physical system and thereby the range profile as:

$$\hat{x}(l)=\tilde{w}^H(l)y(l)$$

where $\tilde{w}(l)$ is a piecewise Minimum Mean-Square Error (MMSE) pulse compression filter;

computing $\tilde{w}(l)$ by combining M number of length-K filter segments corresponding to M number of length-K segments of the received signal y(l), and wherein the $m^{th}$ length-K filter segment $\tilde{w}_m(l)$ is computed as:

$$\tilde{w}_m(\ell) = (E[\tilde{y}_m(\ell)\tilde{y}_m^H(\ell)])^{-1} E\left[\frac{1}{M}\tilde{y}_m(\ell)x^*(\ell)\right]$$

for $m=0, 1, \ldots, M-1$, where $\tilde{y}_m(l)$ is the $m^{th}$ length-K segment of the N contiguous samples of the received signal y(l); and, combining the filter segments $\tilde{w}_m(l)$ in a manner corresponding to the segmentation of the received signal y(l) that approximates a range-dependent MMSE filter w(l) obtained by minimizing the MMSE cost function $$J(l)=E[|x(l)-w^H(l)y(l)|^2]$$

for each individual range cell $l=0, 1, \ldots, L-1$.

2. The method of claim 1 wherein $$K = \frac{N}{M}$$

such that the K-length segments are of the same length.

3. The method of claim 2 wherein the received signal y(l) is segmented in a decimated manner such that:

$$\tilde{y}_m(l)=[y(l+m)y(l+M+m)\ldots y(l+N-2M+m)y(l+N-M+m)]^T$$

for $m=0, 1, \ldots, M-1$; and, wherein the filter segments are computed as:

$$\tilde{w}_m(\ell) = \frac{1}{M}\hat{\rho}(\ell)\left(\tilde{C}_m(\ell) + \tilde{R}_m\right)^{-1} s_m$$

where $\hat{\rho}(l)=|\hat{x}(l)|^2$ is the estimated power of x(l), $\tilde{R}_m=E[\tilde{v}_m(l)\tilde{v}_m^H(l)]$ is a decimated noise covariance matrix based on a decimated segmentation of the noise signal v(l) like that of the received signal y(l), and the decimated signal correlation matrix $\tilde{C}_m(l)$ is:

$$\tilde{C}_m(\ell) = \sum_{i=0}^{M-1} \sum_{k=-K+1}^{K-1} \hat{\rho}(\ell + Mk - i + m)s_{i,k}s_{i,k}^H$$

where $s_{i,k}$ is the $i^{th}$ decimated segment of s delay shifted by k based on a decimated segmentation of s like that of the received signal y(l).

4. The method of claim 2 wherein the received signal y(l) is segmented into contiguous blocks such that:

$$\tilde{y}_m(l)=[y(l+Km)y(l+Km+1)\ldots y(l+Km+K-2)y(l+Km+K-1)]^T$$

for $m=0, 1, \ldots, M-1$; and, wherein the filter segments are computed as:

$$\tilde{w}_m(\ell) = \frac{1}{M}\hat{\rho}(\ell)\left(\tilde{C}_m(\ell) + \tilde{R}_m\right)^{-1} s_m$$

where $\hat{\rho}(l)=|\hat{x}(l)|^2$ is the estimated power of x(l), $\tilde{R}_m=E[\tilde{v}_m(l)\tilde{v}_m^H(l)]$ is a blocked noise covariance matrix based on a blocked segmentation of the noise signal v(l) like that of the received signal y(l), and the blocked signal correlation matrix $\tilde{C}_m(l)$ is $$\tilde{C}_m(\ell) = \sum_{k=-N+1}^{K-1} \hat{\rho}(\ell + k + Km)s_k s_k^H$$

where $s_k$ is the $k^{th}$ delay shift of the K-length blocked segment of the transmitted waveform s based on a blocked segmentation of s like that of the received signal y(l).

5. The method of claim 1 wherein $$K \neq \frac{N}{M}$$

such that the K-length segments are of varying length.

6. The method of claim 1 further comprising initializing the value of $\hat{x}(l)$ by a matched filter method as:

$$\hat{x}(l)=s^H y(l)$$

wherein the value of $\hat{x}(l)$ is then updated as:

$$\hat{x}(l)=\tilde{w}^H(l)y(l)$$

using the piecewise MMSE pulse compression filter $\tilde{w}(l)$.

7. The method of claim 1 further comprising initializing the value of $\hat{x}(l)$ and then iteratively computing the value of $\hat{x}(l)$ as:

$$\hat{x}(l)=\tilde{w}^H(l)y(l)$$

using the piecewise MMSE pulse compression filter $\tilde{w}(l)$ for a plurality of stages in order to adaptively suppress range sidelobes to a desired level.

8. The method of claim 1 wherein the transmitted energy pulse waveform is selected from a radar pulse, an acoustic pulse, and a laser pulse.

9. A system for estimating the range profile of a physical system that characterizes the location of scatterers in the physical system as designated by a plurality of range cells, comprising:

a transmitter for transmitting an energy pulse waveform to the physical system, wherein a discrete-time version of the transmitted waveform is denoted as the column vector $s=[s_0\ s_1\ \ldots\ s_N]^T$ having length N, where N is an integer;

a receiver for receiving a return signal produced by scattering of the transmitted waveform by the physical system as represented by the convolution of the transmitted waveform with the impulse response of the physical system, the received return signal being denoted in discrete notation at the $l^{th}$ range cell as:

$$y(l)=x^T(l)s+v(l)$$

for $l=0,\ldots,L+N-2$, where $x(l)=[x(l)\ x(l-1)\ \ldots\ x(l-N+1)]^T$ is the portion of the range profile that the transmitted waveform s convolves with at delay l, v(l) is a sample of an additive noise signal, and L is the number of range cells of interest; and, a processor programmed to:

compute an estimate $\hat{x}(l)$ of the impulse response of the physical system and thereby the range profile as:

$$\hat{x}(l)=\tilde{w}^H(l)y(l)$$

where $\tilde{w}(l)$ is a piecewise Minimum Mean-Square Error (MMSE) pulse compression filter;

compute $\tilde{w}(l)$ by combining M number of length-K filter segments corresponding to M number of length-K segments of the received signal y(l), and wherein the $m^{th}$ length-K filter segment $\tilde{w}_m(l)$ is computed as:

$$\tilde{w}_m(\ell) = (E[\tilde{y}_m(\ell)\tilde{y}_m^H(\ell)])^{-1}E\left[\frac{1}{M}\tilde{y}_m(\ell)x^*(\ell)\right]$$

for $m=0, 1, \ldots, M-1$, where $\tilde{y}_m(l)$ is the $m^{th}$ length-K segment of the N contiguous samples of the received signal y(l); and, combine the filter segments $\tilde{w}_m(l)$ in a manner corresponding to the segmentation of the received signal y(l) that approximates a range-dependent MMSE filter w(l) obtained by minimizing the MMSE cost function $$J(l)=E[|x(l)-w^H(l)y(l)|^2]$$

for each individual range cell $l=0, 1, \ldots, L-1$.

10. The system of claim 9 wherein $$K = \frac{N}{M}$$

such that the K-length segments are of the same length.

11. The system of claim 10 wherein the processor is programmed to segment the received signal y(l) is in a decimated manner such that:

$$\tilde{y}_m(l)=[y(l+m)y(l+M+m)\ldots y(l+N-2M+m)y(l+N-M+m)]^T$$

for $m=0, 1, \ldots, M-1$; and, wherein the processor is programmed to compute the filter segments:

$$\tilde{w}_m(\ell) = \frac{1}{M}\hat{\rho}(\ell)\left(\tilde{C}_m(\ell) + \tilde{R}_m\right)^{-1}s_m$$

where $\hat{\rho}(l)=|\hat{x}(l)|^2$ is the estimated power of x(l), $\tilde{R}_m=E[\tilde{v}_m(l)\tilde{v}_m^H(l)]$ is a decimated noise covariance matrix based on a decimated segmentation of the noise signal v(l) like that of the received signal y(l), and the decimated signal correlation matrix $\tilde{C}_m(l)$ is:

$$\tilde{C}_m(\ell) = \sum_{i=0}^{M-1}\sum_{k=-K+1}^{K-1}\hat{\rho}(\ell+Mk-i+m)s_{i,k}s_{i,k}^H$$

where $s_{i,k}$ is the $i^{th}$ decimated segment of s delay shifted by k based on a decimated segmentation of s like that of the received signal y(l).

12. The system of claim 10 wherein the processor is programmed to segment the received signal y(l) into contiguous blocks such that:

$$\tilde{y}_m(l)=[y(l+Km)y(l+Km+1)\ldots y(l+Km+K-2)y(l+Km+K-1)]^T$$

for $m=0, 1, \ldots, M-1$; and, wherein the processor is programmed to compute the filter segments as:

$$\tilde{w}_m(\ell) = \frac{1}{M}\hat{\rho}(\ell)\left(\tilde{C}_m(\ell) + \tilde{R}_m\right)^{-1}s_m$$

where $\hat{\rho}(l)=|\hat{x}(l)|^2$ is the estimated power of x(l), $\tilde{R}_m=E[\tilde{v}_m(l)\tilde{v}_m^H(l)]$ is a blocked noise covariance matrix based on a blocked segmentation of the noise signal v(l) like that of the received signal y(l), and the blocked signal correlation matrix $\tilde{C}_m(l)$ is $$\tilde{C}_m(\ell) = \sum_{k=-N+1}^{K-1}\hat{\rho}(\ell+k+Km)s_k s_k^H$$

where $s_k$ is the $k^{th}$ delay shift of the K-length blocked segment of the transmitted waveform s based on a blocked segmentation of s like that of the received signal y(l).

13. The system of claim 9 wherein $$K \neq \frac{N}{M}$$

such that the K-length segments are of varying length.

14. The system of claim 9 wherein the processor is programmed to initialize the value of $\hat{x}(l)$ by a matched filter method as:

$$\hat{x}(l) = s^H y(l)$$

and then update the value of $\hat{x}(l)$ as:

$$\hat{x}(l) = \tilde{w}^H(l) y(l)$$

using the piecewise MMSE pulse compression filter $\tilde{w}(l)$.

15. The system of claim 9 wherein the processor is programmed to initialize the value of $\hat{x}(l)$ and then iteratively compute the value of $\hat{x}(l)$ as:

$$\hat{x}(l) = \tilde{w}^H(l) y(l)$$

using the piecewise MMSE pulse compression filter $\tilde{w}(l)$ for a plurality of stages in order to adaptively suppress range sidelobes to a desired level.

16. The system of claim 9 wherein the transmitted energy pulse waveform is selected from a radar pulse, an acoustic pulse, and a laser pulse.

* * * * *

UNITED STATES PATENT AND TRADEMARK OFFICE
CERTIFICATE OF CORRECTION

| | |
|---|---|
| PATENT NO. | : 7,602,331 B2 |
| APPLICATION NO. | : 11/837243 |
| DATED | : October 13, 2009 |
| INVENTOR(S) | : Shannon D. Blunt et al. |

It is certified that error appears in the above-identified patent and that said Letters Patent is hereby corrected as shown below:

In column 1, line 11, below "reference." insert -- GOVERNMENT RIGHT
This invention was made with Government support under Contract number N00014-06-1-004 awarded by the department of the Navy. The Government has certain right in the invention. --.

Signed and Sealed this

Twenty-seventh Day of April, 2010

David J. Kappos
*Director of the United States Patent and Trademark Office*